United States Patent [19]
Kurokawa

[11] Patent Number: 5,244,436
[45] Date of Patent: Sep. 14, 1993

[54] POWER TRANSMISSION V-BELT

[75] Inventor: Tomomitu Kurokawa, Kobe, Japan

[73] Assignee: Mitsuboshi Belting Ltd., Nagata, Japan

[21] Appl. No.: 742,029

[22] Filed: Aug. 8, 1991

[30] Foreign Application Priority Data

Aug. 10, 1990 [JP] Japan ............................ 2-85353[U]

[51] Int. Cl.⁵ .............................................. F16G 1/08
[52] U.S. Cl. .................................... 474/260; 474/268
[58] Field of Search ............................ 474/260–265, 474/268, 271

[56] References Cited

U.S. PATENT DOCUMENTS

| | | | |
|---|---|---|---|
| 2,631,463 | 3/1953 | Waugh | 474/260 |
| 3,996,813 | 12/1976 | Henderson et al. | 474/261 X |
| 4,022,070 | 5/1977 | Wolfe | 474/261 X |
| 4,632,665 | 12/1986 | Skura | 474/268 X |

Primary Examiner—Thuy M. Bui
Attorney, Agent, or Firm—Wood, Phillips, VanSanten, Hoffman & Ertel

[57] ABSTRACT

A power transmission V-belt having a plurality of longitudinally extending load-carrying/tensile cords embedded in an adhesive rubber layer, a compression section having a plurality of laterally extending cords embedded in a second rubber layer, and a reinforcing rubber layer interposed between the adhesive rubber layer and the laterally extending cords.

25 Claims, 2 Drawing Sheets

5,244,436

POWER TRANSMISSION V-BELT

BACKGROUND OF THE INVENTION

1. Field of the Invention

This invention relates to power transmission V-belts and, more particularly, to a belt that is particularly adaptable for use with stepless speed variation pulleys and which is constructed to resist a) side face and tensile/load-carrying cord degradation, b) peeling of adjacent layers, and c) fly-out of the load-carrying cords by reason of the outer portion of the drive/driven side faces being forcibly engaged by cooperating pulley parts during operation.

2. Background Art

V-belts are constructed with laterally oppositely facing drive/driven faces which effect pulley rotation utilizing a wedging action between the belt and cooperating pulley surfaces. The lateral pressure on the belt side faces may be very substantial during operation, particularly in speed variable systems. Normally, V-belts used in speed variable systems are constructed with wide outside surfaces to resist this high lateral pressure.

It is also known, to rigidify such V-belts in the lateral direction, to employ a STIFLEX ™ layer having short staple reinforcing fibers embedded therein and oriented in generally a lateral direction in that portion of the belt that is the most heavily compressed by the pulley parts. Nonetheless, such belts, over time, become substantially deformed as they are engaged by the speed variation pulleys. This deformation may occur early in the belt life in systems in which the pulley parts repetitively squeeze and release the side faces of the belt during normal operation.

Aside from the problem of belt deformation, V-belts used in speed variation pulley systems are prone to cracking, particularly at the outside region of the belt.

A further problem is that the pulleys, by severely squeezing the outside region of the side faces of the V-belt, tend to effect fly-out of the load-carrying cords from the belt rubber layer in which they are embedded and/or peeling of the rubber layer, in which the load-carrying cords are embedded, from an adjacent layer.

A still further problem with the prior art belts is that the repeated opening and closing of the pulley pieces, defining the variable speed pulley, may result in premature and excessive wear on the side faces of the belt. For example, as the pulley pieces move closer together to increase the effective diameter of the pulley, the side surfaces are squeezed with a force substantial enough to wedge the belt outwardly, which causes considerable frictional wear on the belt side faces. Eventually, the wear becomes significant enough that the effective width of the belt is decreased which results in a change in the speed variation ratio. Consequently, over time, the operation of the overall system, in which the belt operates, changes and becomes unpredictable.

To eliminate the above problems, the assignee of the present invention devised a speed variation V-belt, as disclosed in Japanese Patent Laid-Open No. 164840/1989. As shown in that publication, at least one, and preferably a plurality, of sheets/layers of reed cord screen-like material are provided with the reed cords extending substantially parallel to each other and laterally of the belt.

The structure shown in Japanese Patent Laid-Open No. 164840/1989 is a cogged belt with longitudinally spaced cogs/teeth and U-shaped valleys between adjacent cogs/teeth formed from HRH-compound rubber. Load-carrying cords are embedded in an adhesive rubber layer. One reed cord screen-like sheet/layer is embedded in the compression section of the belt so as to bisect the distance between the load-carrying cords and the base of the valleys. The reed cord screen-like sheet/layer assumes a wave-like pattern during manufacture to generally follow the contour of the cogs/teeth. It is preferred that the thickness of the reed cords be in the range of 0.20 to 0.45 times as large as the distance between the bottom edge of the load-carrying cords and the base of the valley. A canvas layer is placed on the inside and/or outside rubber surfaces of the belt.

While the above belt construction has proven very successful, there have been two associated problems. The first is a result of the method of manufacturing the cogged belt. The cogged belt is manufactured by first forming the cogs/teeth and then vulcanizing the belt. In forming the cogs/teeth, the reed cord screen-like sheet/layer is bent in a wave form to generally follow the cog/tooth shape. During belt formation, the adhesive rubber layer tends to gather at the cogged portion of the belt. The result of this may be that the reed cords come into direct contact with the load-carrying cords in the vicinity of the valleys. This problem is aggravated by the thinness of the adhesive rubber layer. The result of this is that, during operation, the engaged load-carrying and reed cords tend to abrade each other, which may ultimately cause rupture of the load-carrying cord(s) and thereby reduce the belt capacity.

The second problem is that the lateral pressure exerted by the pulleys on the side faces of the V-belt causes belt deformation, particularly at the outer portion of the belt. Aside from the deformation that occurs, there is a tendency of a) the adjacent belt layers to peel and, more particularly, for the adhesive layer with the load-carrying cords to peel from the remainder of the belt and b) the load-carrying cords to "fly out" of the rubber layer in which they are embedded. These problems are attributable to the fact that the reed cords are substantially rigid and the adhesive rubber layer is relatively flexible in the lateral direction. As the belt deforms under the forces produced by the pulleys, the reed cords remain relatively stationary and the adhesive layer bends and tends to be peeled back towards the middle of the belt. This may release the load-carrying cords from the rubber layer in which they are embedded and/or separate the rubber layer in which the load-carrying cords are embedded from an adjacent layer. This problem is aggravated in environments in which the deformation is repetitive during system operation.

SUMMARY OF THE INVENTION

The present invention is specifically directed to overcoming the above-enumerated problems in a novel and simple manner.

It is the principal objective of the present invention to provide a power transmission V-belt in which cogs/teeth can be formed by conventional techniques without causing direct contact between reed cords in a screen-like sheet/layer and tensile/load-carrying cords, even using a relatively thin adhesive layer in which the load-carrying cords are embedded.

It is a further objective of the present invention to a) prevent the load-carrying cords from pulling out of the adhesive layer in which they are embedded and b) prevents the adhesive layer from separating from the reed cords/compression section rubber layer under severe belt deformation.

More particularly, to achieve the above objectives, the present invention contemplates a power transmission V-belt having a plurality of longitudinally extending load-carrying/tensile cords embedded in an adhesive rubber layer, a compression section having a plurality of laterally extending cords embedded in a second rubber layer, and a reinforcing rubber layer interposed between the adhesive rubber layer and the laterally extending cords.

The reinforcing rubber layer serves as a spacer between the laterally extending cords and the load-carrying cords.

Additionally, the reinforcing rubber layer reduces the otherwise extreme difference of lateral resistance between the adhesive rubber layer and cords which could precipitate tensile cord fly-out and/or separation between the adhesive rubber layer and the lateral cords and/or compression section rubber.

A highly durable belt is produced which is particularly adaptable to systems employing stepless speed variation pulleys.

In order to avoid the extreme difference of lateral resistance in different parts of the belt, the reinforcing rubber layer is rigidified in the lateral direction by short staple fibers extending in the lateral direction. The invention contemplates the provision of short staple reinforcing fibers in the adhesive rubber layer as well, however greater rigidity in the lateral direction is afforded by providing a greater weight percentage of fibers in the reinforcing rubber layer than in the adhesive rubber layer.

Preferably, the reinforcing fibers are present in the reinforcing rubber layer in an amount of between 5-35 weight parts to 100 weight parts of rubber. The weight percent of the reinforcing fibers in the compression rubber layer is from 0-30% greater than the weight percent of reinforcing fibers in the reinforcing rubber layer.

In a preferred form, the aspect ratio of the reinforcing fibers in the reinforcing rubber layer and adhesive rubber layer is between 50 and 2,000. The invention contemplates that the short staple reinforcing fibers are made from at least one of: a) inorganic fiber that is a natural fiber of one of cotton and pulp; b) synthetic fiber that is one of nylon, polyester, aramid and carbon fiber; and c) semisynthetic fiber that is one of artificial silk and rayon.

Preferably, the reinforcing rubber layer has a thickness of between 0.2 and 5 mm.

In one form of the invention, the laterally extending cords are reed cords that are part of a screen-like sheet/layer.

The cords are preferably located in a range of 0.05 to 0.8 W from the inside edges of the load-carrying cords, where W is equal to the distance between the inside edges of the load-carrying cords and the inside surface of the V-belt. In cogged belts, W is equal to the distance between the inside edges of the load-carrying cords and the inside surface of the valley between adjacent cogs/teeth at the point therein closest to the load-carrying cords.

Preferably, the cords are made from at least one of polyester, aliphatic polyamide, aromatic polyamide, glass fiber and carbon fiber.

In one form, the adhesive rubber layer is at least one of NR, SBR, CR and NBR. The invention contemplates that the compression section rubber and reinforcing rubber layer be made of the same material as the adhesive rubber layer.

DETAILED DESCRIPTION OF THE DRAWINGS

Figure 1:
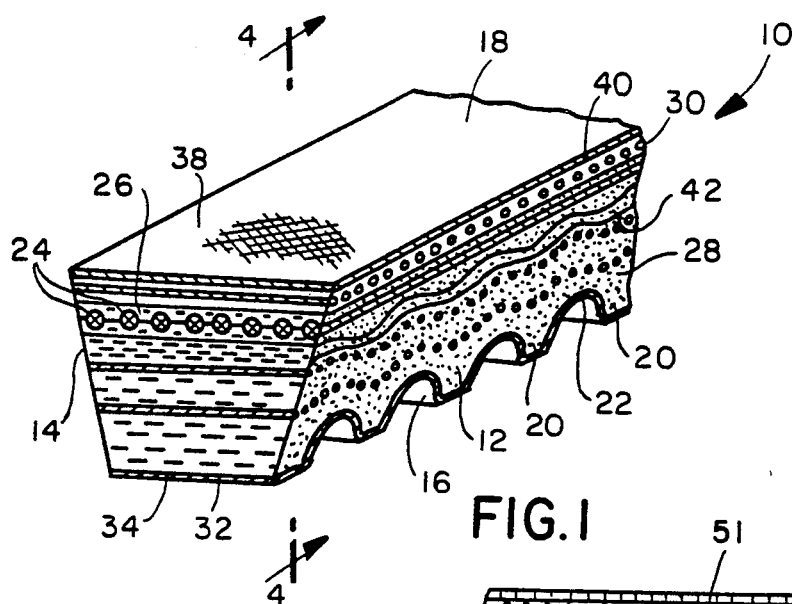
FIG. 1 is a perspective view of a cogged V-belt according to the present invention.
Figure 2:
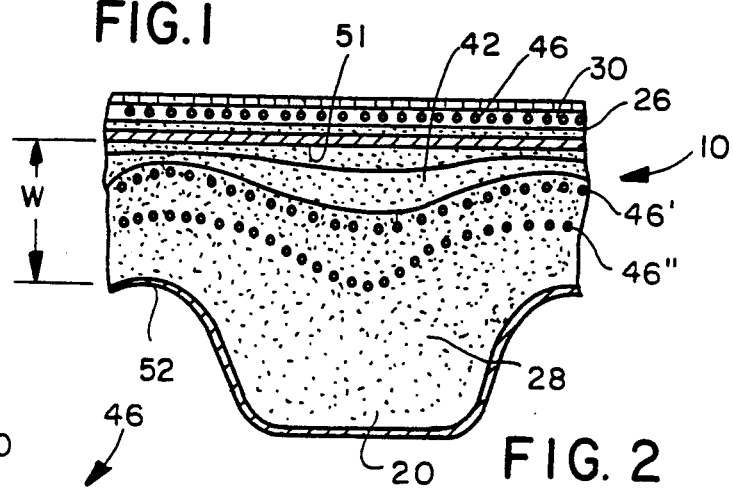
FIG. 2 is an enlarged, side elevation view of the V-belt in FIG. 1.

In FIGS. 1-4, a cogged power transmission V-belt, according to the present invention, is shown at 10. While the belt configuration shown in FIGS. 1-4 is exemplary of one type of belt that is suitable for incorporation of the present invention, this disclosure should not be viewed as limiting the invention to this belt type. As a general matter, the invention is intended to be incorporated into V-belts of the raw-edged type, whether a cogged V-belt, an REV belt, or the like. The invention is particularly adaptable to belts having a wider upper surface than the height of the belt, which belts are typically used with stepless speed variation pulleys.

More particularly, the belt 10 has a V-shaped cross section defining raw, inclined, laterally oppositely facing side faces 12, 14 for engagement with a pulley (not shown). The belt 10 has oppositely facing inside and outside surfaces 16, 18, respectively. The inside of the belt 10 has a plurality of cogs/teeth 20 of a predetermined pitch with there being valleys 22 between adjacent cogs/teeth 20. The cogs/teeth 20 are configured to mate in grooves in a cooperating pulley (not shown) for the belt to effect driving thereof and be driven thereby.

The belt 10 has a plurality of lengthwise, load-carrying/tensile cords 24 defining a neutral axis for the belt 10. The load-carrying cords 24 are made of a material with low elongation and high strength. Suitable materials for the load-carrying cords 24 are at least one of polyester, aliphatic polyamide, aromatic polyamide name KEVLAR TM ), glass fibers, etc. (trade The cords 24 are embedded in an adhesive rubber layer 26. The adhesive rubber layer 26 is preferably made from one of the following materials, or a blend thereof: NR, SBR, CR, NBR, etc.

A compression section 28 is defined inside of the load-carrying cords 24 with a tension section 30 being defined outside of the cords 24. The rubber in the tension section 30 is preferably the same rubber as that used in the adhesive rubber layer 26 and in the compression section 28.

A canvas layer 32 is adhered to the innermost rubber surface 34 of the compression section 28. A canvas layer 38 is adhered to the outermost surface 40 of the rubber defining the tension section 30. Preferably, 1 to 3 canvas layers 38 are provided on the surface 40. The canvas layer(s) 38 is preferably one of a bias canvas, wide angle canvas made of warp and weft cotton yarns, and stretchable rubber-coated canvas. The rubber-coated canvas is preferably wooly processed nylon with crimped nylon or SPANDEX ™ (elastomeric yarn) warp yarns and normal nylon weft yarns. The layers 38 are adhered by methods known to those skilled in the art. One or a plurality of layers of stretchable rubber-coated canvas, such as that described for the canvas layer(s) 38, is used to cover the outermost rubber surface 40.

The invention contemplates the provision of a reinforcing rubber layer 42, made of one of the same materials noted above for the rubber in the adhesive rubber layer 26, compression section 28, and tension section 30. The reinforcing rubber layer 42 preferably has a thickness of between 0.2 to 5.0 mm.

The invention further contemplates the provision of short staple reinforcing fibers 44 in the rubber in each of the adhesive rubber layer 26, compression section 28, and tension section 30 and oriented in a lateral direction. The amount of the fibers 44 in each of the adhesive rubber layer 26 and compression section 28 is different so that the composition and effective hardness of the adhesive rubber layer 26 and compression section 28 is different, for reasons described below.

The short staple reinforcing fibers 44 preferably have an aspect ratio of 50 to 2,000 and are made of fiber that is one of: a) inorganic fiber, such as natural fiber cotton, pulp, etc.; b) synthetic fiber such as nylon, polyester, aramid, carbon fiber, etc.; or c) semisynthetic fiber such as artificial silk, rayon, etc.

In the adhesive rubber layer 26, 1 to 25 weight parts of short staple reinforcing fibers 44 is provided to 100 weight parts of rubber. If more than the above-specified amount of reinforcing fibers 44 is mixed in the adhesive rubber layer 26, the fibers 44 will prevent the load-carrying cords 24 from effectively adhering to the adhesive rubber in which it is embedded. The result is that the life of the belt is shortened. The load-carrying cords 24 have a tendency to peel away from the adhesive rubber layer 26 and "fly out".

Because the adhesive rubber layer 26 above the load-carrying cords 24 is in tension, and the portion of the adhesive rubber layer 26 below the load-carrying cords 24 is in compression, it is preferred that a lesser amount of short staple reinforcing fibers 44 be embedded in the adhesive rubber layer 26 above the load-carrying cords 24 than below the load-carrying cords 24.

An excess amount of short staple reinforcing fibers 44 in the adhesive rubber layer 26 also weakens that rubber. Additionally, with excessive amounts of fibers 44, relative movement is allowed to occur between the load-carrying cords 24 and fibers 44. In addition to deteriorating the bond between the load-carrying cords 24 and adhesive rubber layer 26, this relative movement produces friction which develops heat and wear on the load-carrying cords 24, which may precipitate their premature failure.

In the reinforcing rubber layer 42, 5 to 35 weight parts of short staple reinforcing fiber 44, with the same aspect ratio and composition as the fibers 44 in the adhesive layer 26, are mixed with every 100 weight parts of rubber in the reinforcing rubber layer 42. The amount of reinforcing fibers 44 in the reinforcing rubber layer 42 is preferably always greater than that in the adhesive rubber layer 26.

The compression section 28 has fibers 44 dispersed therein with the same composition as the fibers 44 in the adhesive layer 26, however, the weight percent of fibers 44 in the compression section 28 is 0 to 30% greater than the weight percent of fibers 44 in the reinforcing rubber layer 42.

It is important that the ratio of fibers 44 be controlled so that there is not a large variation in the ratio of elasticity between the load-carrying cords 24 and adhesive rubber layer 26. Excessive variation could result in peeling of the load-carrying cords 24 from the adhesive rubber layer 26 and/or peeling of the layer 26 due to the stress concentration at the interface of the belt parts having radically different elasticity in a lateral direction.

Figure 3:
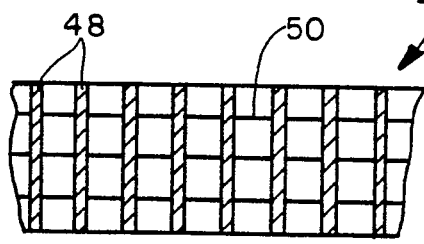
FIG. 3 is a plan view of a reed cord screen-like sheet/layer that is part of the inventive belt of FIGS. 1 and 2.
Figure 4:
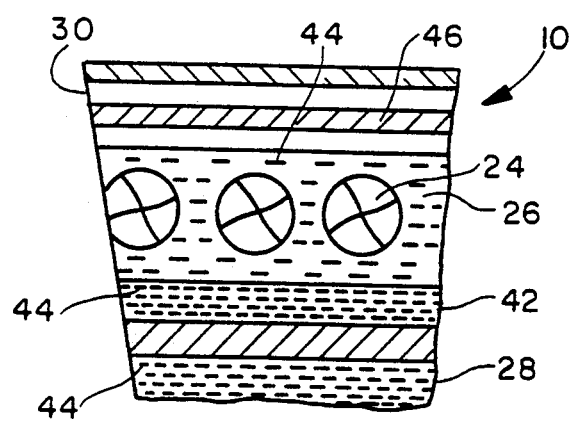
FIG. 4 is a cross-sectional view of the inventive belt taken along line 4—4 of FIG. 1.

The invention contemplates the incorporation of layers of reed cord screen-like sheets/layers, as shown at 46 in FIG. 3. The sheets/layers 46 consist of a plurality of equidistantly spaced cords 48 held together by yarns 50, adhesively bonded thereto to define a unitary structure.

One or more layers (one shown) of reed cord screen-like sheets/layers 46 are embedded in the tension section 30 of the belt 10 so that the cords 48 extend in a lateral direction. The cords 48 are preferably made of one of polyester, aliphatic polyamide, aromatic polyamide, glass fiber, carbon fiber, etc.

Two layers of reed cord screen-like sheets/layers 46', 46" are embedded in the compression section 28 of the belt 10. A single layer or more than two layers of the reed cord screen-like sheet/layer 46, 46', 46" could be employed. The layers 46', 46" are arranged in a wave-like pattern to generally follow the contour of the cogs/teeth 20 and are sufficiently long to be exposed at both side faces 12, 14 of the belt 10.

The position of the layers 46', 46" is in the range of 0.05 to 0.8 W from the lower edge 51 of the load-carrying cords 24, where W is the thickness of the belt 10 from the lower edge 50 of the load-carrying cords 24, i.e. the distance between the lower edge 50 of the load-carrying cords 24 and the base 52 of the valleys 22 between adjacent cogs/teeth 20. The reinforcing rubber layer 42 resides between the load-carrying cords 24 and the outermost layer 46'.

Through experimentation, it has been found that if either layer 46', 46" is less than 0.05 W from the lower cord edges 50, the thickness of the reinforcing rubber layer 42 is reduced to the point that it cannot effectively prevent the aforementioned peeling phenomenon; that is the peeling of the adhesive rubber layer 26 from the layer 46' and/or the compression section 28. On the other hand, if either sheet/layer 46', 46" is more than 0.8 W from the lower edge 50 of the load-carrying cords 24, the sheets/layers 46', 46" locate too close to the bottom of the cogs/teeth 20 to reduce the flexibility of the belt 10. This might cause the development of cracks in the compression section 28, particularly in the thin belt section at the valleys 22. Since the cords 48 in the layers 46', 46" extend laterally and in parallel relationship, there is nothing to inhibit the propagation of a crack in the lateral direction.

It can be seen that with the present invention, the interposing of the reinforcing rubber layer 42 between the adhesive rubber layer 26 and layer 46' eases the concentration of stress between the adhesive rubber layer 26 and layers 46', 46" Compared with the adhesive rubber layer, the reinforcing rubber layer is more rigid and effectively harder by reason of the rubber containing 0–30% more reinforcing fibers.

The reinforcing rubber layer 42 between the adhesive rubber layer 26 and layers 46', 46" serves the additional function of preventing the cords 48 on the sheets/layers 46', 46" from contacting the load-carrying cords 24 at the time of vulcanizing and molding of the belt. This prevents detrimental abrasion, each of the other, as the belt 10 is flexed in use. This abrasion could ultimately result in rupture of the load-carrying cords 24 which diminishes belt performance.

The durability of the inventive belt is demonstrated by the results of experimentation carried out by the assignee herein.

The Inventive Test Belt

A cogged V-belt, according to the present invention, having an outside surface 18 with a 38 mm width, 13 mm of thickness and 1,100 mm of peripheral length was tested. Two layers of reed cord screen-like sheets were embedded in the compression section with the layer 46' 0.2 W and layer 46" 0.5 W from the lower edge 50 of the load-carrying cords 24. A reinforcing rubber layer 42 was provided between the adhesive rubber layer 26 and the layer 46'.

The Conventional Test Belt

Figure 5:
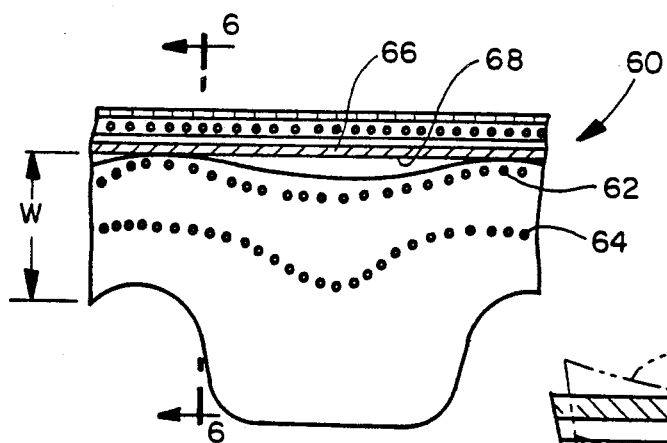
FIG. 5 is a side elevation view of a prior art cogged V-belt.
Figure 6:
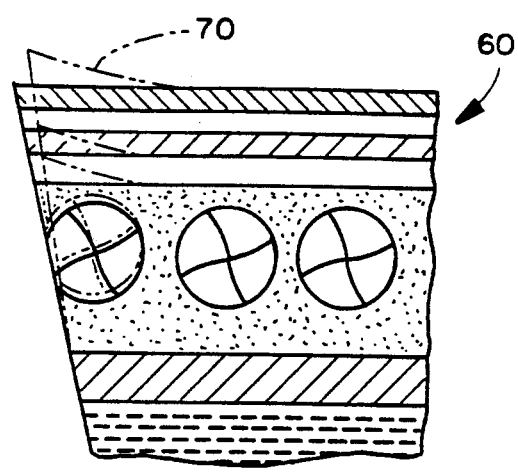
FIG. 6 is a cross-sectional view of the prior art belt taken along line 6—6 of FIG. 5.

A conventional belt of the same shape as the above-described inventive belt 10 was tested. This belt 60 is shown in FIGS. 5 and 6. The belt 60 had two reed cord screen-like sheets/layers 62, 64 below the load-carrying cords 66. The sheet/layer 62 was spaced from the bottom edge 68 of the load-carrying cords 66 at 0.03 W, with the innermost layer 64 spaced at 0.4 W from the bottom edge 68 of the load-carrying cords 66. No reinforcing rubber layer was employed according to the invention.

Test Set-Up

The two belts were engaged with drive pulleys having a diameter of 110 mm and driven pulleys having a diameter of 225 mm. The belts were run under operating conditions of a 270 kg dead weight with 5 ps of load and a rotating speed of 1800 rpm. The lapse of running time and variations in distances between the shafts on the pulleys were measured to develop the data shown on the graph of FIG. 7. The time at which trouble/failure occurred and the nature of that trouble/failure was noted, with the results identified in the following Table 1.

TABLE 1

|  | INVENTIVE BELT | CONVENTIONAL BELT |
| --- | --- | --- |
| Reinforcing Rubber Layer | Yes | No |
| Trouble Occurring Time | 34 hrs. | 15 hrs. |
| Trouble Occurring Phenomenon | Separation between load-carrying cords and adhesive rubber layer | Fly-out of load-carrying cord from adhesive rubber layer |

From the above, it can be seen that the running time of the inventive belt up to the time the trouble occurred was approximately twice as long as with the conventional belt. When the conventional belt failed, the nature of the failure was fly-out of the load-carrying cords. The failure of the inventive belt, which was less severe, was mere separation between the load-carrying cords and the adhesive rubber layer. As to the separation at the boundary of the compression rubber layer and the adhesive rubber layer, the inventive belt was more intact as observed from the outside of the belt.

In FIG. 6, the deformation of the belt 60 that results in peeling and load-carrying cord fly-out can be seen with respect to the conventional belt 60. As shown in phantom lines, the corner 70 of the belt 60 is bent considerably when compressed between the pulleys of a variable speed pulley system.

Figure 7:
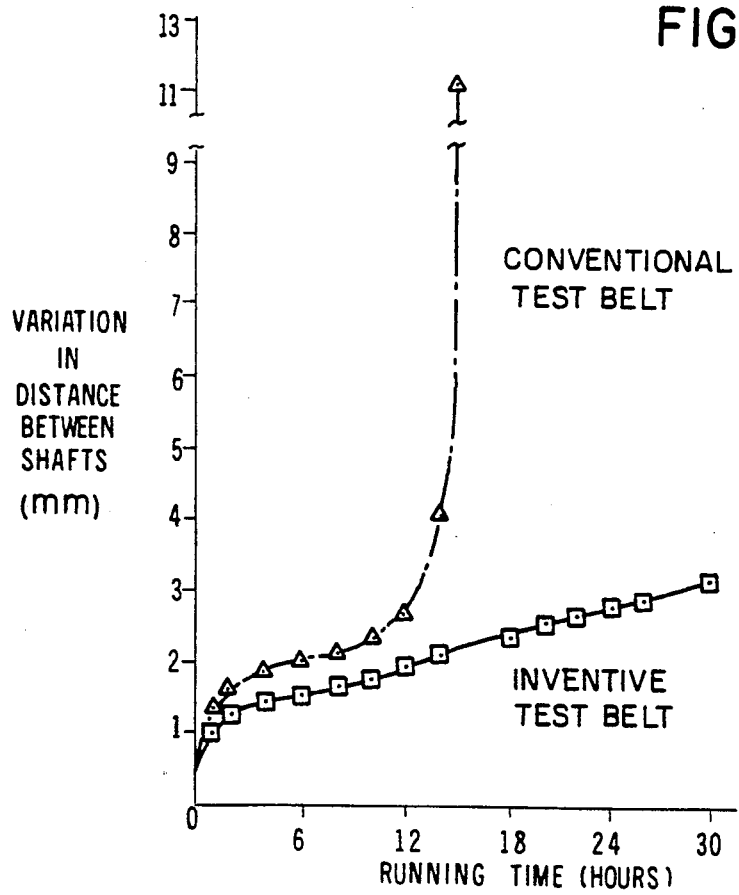
FIG. 7 is a graph of belt running time versus variation in the distance between the shafts of pulleys for both the inventive and prior art belts.

As seen in the graph in FIG. 7, the line of the conventional belt rises abruptly when 4 mm of elongation occurred between the shafts of the pulleys after 15 hours of running time elapsed. Load-carrying cord fly-out occurred at this time and the deformation of the belt was increased. It was concluded that the distance between the shafts of the pulleys was abruptly lengthened by the direct influence of the dead weight.

The foregoing disclosure of specific embodiments is intended to be illustrative of the broad concepts comprehended by the invention.

I claim:

1. A power transmission V-belt comprising:
    a plurality of longitudinally extending load-carrying cords embedded in an adhesive rubber layer;
    a compression section having a plurality of laterally extending cords embedded in a second rubber layer; and
    a reinforcing rubber layer interposed between said adhesive rubber layer and said laterally extending cords to maintain a space between and thereby prevent inadvertent contact between the laterally extending cords and the load-carrying cords.

2. The power transmission V-belt according to claim 1 wherein the laterally extending cords are reed cords that are part of a screen-like sheet/layer.

3. The power transmission V-belt according to claim 1 wherein the reinforcing rubber layer has a different composition than the adhesive rubber layer.

4. The power transmission V-belt according to claim 1 wherein there are laterally extending short staple reinforcing fibers in at least one of said reinforcing rubber layer, adhesive rubber layer and second rubber layer.

5. The power transmission V-belt according to claim 1 wherein there are laterally extending short staple reinforcing fibers in each of said reinforcing rubber layer and said adhesive rubber layer and the weight percentage of short staple reinforcing fibers in the reinforcing rubber layer is greater than the weight percentage of reinforcing fibers in the adhesive rubber layer.

6. The power transmission V-belt according to claim 5 wherein the short staple reinforcing fibers are present in the reinforcing rubber layer in an amount of 4–35 weight parts to 100 weight parts of rubber.

7. The power transmission V-belt according to claim 4 wherein the amount of short staple reinforcing fibers in the second rubber layer is from 0–30% more than the amount of short staple reinforcing fibers in the reinforcing rubber layer.

8. The power transmission V-belt according to claim 1 wherein the V-belt has an inside surface and an outside surface, the load-carrying cords, each have an inside edge, W is equal to the distance between the inside edges of the load-carrying cords and the inside surface of the V-belt and the laterally extending cords are located in a range of 0.05–0.8 W from the inside edges of the load-carrying cords.

9. The power transmission V-belt according to claim 8 wherein the V-belt is a cogged belt with cogs/teeth and valleys between adjacent cogs/teeth and W is equal to the distance between the inside edges of the load-carrying cords and the inside surface of the belt at the valley at a point therein closest to the load-carrying cords.

10. The power transmission V-belt according to claim 5 wherein the aspect ratio of the short staple reinforcing fibers in each of the reinforcing rubber layer and adhesive rubber layer is between 50 and 2,000.

11. The power transmission V-belt according to claim 1 wherein the reinforcing rubber layer has a thickness of between 0.2 and 5.0 mm.

12. The power transmission V-belt according to claim 5 wherein the short staple reinforcing fibers are made from at least one of : a) inorganic fiber that is a natural fiber of one of cotton and pulp; b) synthetic fiber that is one of nylon, polyester, aramid, and carbon fiber; and c) semisynthetic fiber that is one of artificial silk and rayon.

13. The power transmission V-belt according to claim 1 wherein the adhesive rubber layer comprises at least one of NR, SBR, CR and NBR.

14. The power transmission V-belt according to claim 1 wherein the laterally extending cords are made from at least one of polyester, aliphatic polyamide, aromatic polyamide, glass fiber and carbon fiber.

15. A power transmission V-belt having a length and laterally spaced drive/driven side faces, said V-belt comprising:
   a plurality of longitudinally extending load-carrying cords embedded in an adhesive rubber layer;
   a screen-like sheet/layer having elongate, substantially parallel reed cords;
   a compression section including a second rubber layer having the screen-like sheet/layer embedded therein so that the reed cords extend laterally of the V-belt; and
   a reinforcing rubber layer interposed between the adhesive rubber layer and the screen-like sheet/layer to maintain a space between and thereby prevent inadvertent contact between the reed cords and the load-carrying cords,
   the composition of the adhesive rubber layer and reinforcing rubber layer being different, each from the other.

16. The power transmission V-belt according to claim 15 wherein there are laterally extending short staple reinforcing fibers in at least one of said reinforcing rubber layer, adhesive rubber layer and second rubber layer.

17. The power transmission V-belt according to claim 15 wherein there are laterally extending short staple reinforcing fibers in each of said reinforcing rubber layer and said adhesive rubber layer and the weight percentage of reinforcing fibers in the reinforcing rubber layer is greater than the weight percentage of reinforcing fibers in the adhesive rubber layer.

18. The power transmission V-belt according to claim 15 wherein there are short staple reinforcing fibers in the reinforcing rubber layer and the second layer and the amount of short staple reinforcing fibers in the second rubber layer is from 0–30% more than the amount of short staple reinforcing fibers in the reinforcing rubber layer.

19. The power transmission V-belt according to claim 15 wherein the V-belt has an inside surface and an outside surface, the load-carrying cords each have an inside edge, W is equal to the distance between the inside edges of the load-carrying cords and the inside surface of the V-belt, and the laterally extending cords are located in a range of 0.05–0.8 W from the inside edges of the load-carrying cords.

20. The power transmission V-belt according to claim 19 wherein the V-ribbed belt is a cogged belt with cogs/teeth and valleys between adjacent cogs/teeth and W is equal to the distance between the inside edges of the load-carrying cords and the inside belt surface at a valley at the point therein closest to the load-carrying cords.

21. The power transmission V-belt according to claim 15 wherein the aspect ratio of the short staple reinforcing fibers in each of the reinforcing rubber layer and adhesive rubber layer is between 50 and 2,000.

22. The power transmission V-belt according to claim 15 wherein the reinforcing rubber layer has a thickness of between 0.2 and 5.0 mm.

23. The power transmission V-belt according to claim 17 wherein the short staple reinforcing fibers are made from at least one of : a) inorganic fiber that is a natural fiber of one of cotton and pulp; b) synthetic fiber that is one of nylon, polyester, aramid, and carbon fiber; and c) semisynthetic fiber that is one of artificial silk and rayon.

24. The power transmission V-belt according to claim 15 wherein the adhesive rubber layer comprises at least one of NR, SBR, CR and NBR.

25. The power transmission V-belt according to claim 15 wherein the laterally extending cords are made from at least one of polyester, aliphatic polyamide, aromatic polyamide, glass fiber and carbon fiber.

* * * * *